(12) United States Patent
Jensen et al.

(10) Patent No.: US 9,985,578 B2
(45) Date of Patent: May 29, 2018

(54) SYSTEMS FOR ATTACHING MOUNTING RAILS ONTO PHOTOVOLTAIC MOUNTING POSTS

(71) Applicant: SolarCity Corporation, San Mateo, CA (US)

(72) Inventors: Soren Jensen, Corte Madera, CA (US); Brian Atchley, Petaluma, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days. days.

(21) Appl. No.: 14/832,777

(22) Filed: Aug. 21, 2015

(65) Prior Publication Data

US 2016/0380578 A1    Dec. 29, 2016

Related U.S. Application Data

(60) Provisional application No. 62/185,363, filed on Jun. 26, 2015.

(51) Int. Cl.
| | |
|---|---|
| *E04D 13/18* | (2014.01) |
| *H02S 20/24* | (2014.01) |
| *F24J 2/52* | (2006.01) |
| *H02S 20/20* | (2014.01) |
| *F16M 11/10* | (2006.01) |
| *F16M 11/16* | (2006.01) |
| *F24J 2/46* | (2006.01) |

(52) U.S. Cl.
CPC .............. *H02S 20/24* (2014.12); *F16M 11/10* (2013.01); *F16M 11/16* (2013.01); *F24J 2/526* (2013.01); *H02S 20/20* (2014.12); *F24J 2002/467* (2013.01); *F24J 2002/4672* (2013.01)

(58) Field of Classification Search
CPC ......... H02S 20/24; H02S 20/20; F16M 11/16; F16M 11/10; F24J 2/526; F24J 2002/467; F24J 2002/4672
USPC ................... 52/173.3, 235; 24/457, 453, 458
See application file for complete search history.

(56) References Cited

U.S. PATENT DOCUMENTS

| | | | | |
|---|---|---|---|---|
| 2,548,838 | A * | 4/1951 | Gillespie | F16B 5/0642 24/453 |
| 3,705,442 | A * | 12/1972 | Sygnator | F16B 5/065 174/138 D |
| 6,360,406 | B1 * | 3/2002 | Patterson | H01R 13/6275 24/453 |
| 6,964,137 | B2 * | 11/2005 | Frascari | E04F 13/0819 52/235 |

(Continued)

FOREIGN PATENT DOCUMENTS

WO     2008/124158 A1     10/2008

OTHER PUBLICATIONS

International Search Report, dated Sep. 8, 2016, for related international application No. PCT/US2016/031842, 6 pages.

(Continued)

*Primary Examiner* — Basil Katcheves
*Assistant Examiner* — Joshua Ihezie
(74) *Attorney, Agent, or Firm* — Kilpatrick Townsend & Stockton LLP

(57) ABSTRACT

A system for connecting a photovoltaic mounting rail onto a mounting post using a connection system with a pair of interlocking grasps having interdigitated fingers that can be locked into the mounting rail when moved by a fastening system.

15 Claims, 19 Drawing Sheets

(56) References Cited

U.S. PATENT DOCUMENTS

| | | | | |
|---|---|---|---|---|
| D513,971 S * | 1/2006 | Gaster | | E04F 13/0819 D8/383 |
| 8,347,569 B1 * | 1/2013 | McIntyre | | E04F 13/0814 52/235 |
| 8,413,944 B2 * | 4/2013 | Harberts | | F24J 2/5205 248/500 |
| 8,695,290 B1 * | 4/2014 | Kim | | F24J 2/5252 248/225.11 |
| 8,881,484 B2 * | 11/2014 | Zante | | F24J 2/5232 52/173.3 |
| 8,957,302 B1 * | 2/2015 | Seery | | F16M 13/02 136/244 |
| 9,478,688 B2 * | 10/2016 | Kanbara | | F24J 2/5211 |
| 2002/0176762 A1 * | 11/2002 | Moerke | | F16B 19/1081 411/45 |
| 2003/0070368 A1 * | 4/2003 | Shingleton | | F24J 2/5205 52/173.3 |
| 2008/0086850 A1 * | 4/2008 | Smith | | B60R 13/0206 24/289 |
| 2010/0026028 A1 * | 2/2010 | Smith | | B60R 13/0206 296/29 |
| 2011/0000519 A1 * | 1/2011 | West | | F24J 2/5211 136/244 |
| 2011/0179606 A1 * | 7/2011 | Magno, Jr. | | F24J 2/5258 24/457 |
| 2012/0298186 A1 * | 11/2012 | West | | F24J 2/5211 136/251 |

OTHER PUBLICATIONS

Written Opinion, dated Sep. 8, 2016, for related international application No. PCT/US2016/031842, 7 pages.

International Preliminary Report on Patentability mailed Jan. 4, 2018 for International Application No. PCT/US2016/031842. 9 pages.

* cited by examiner

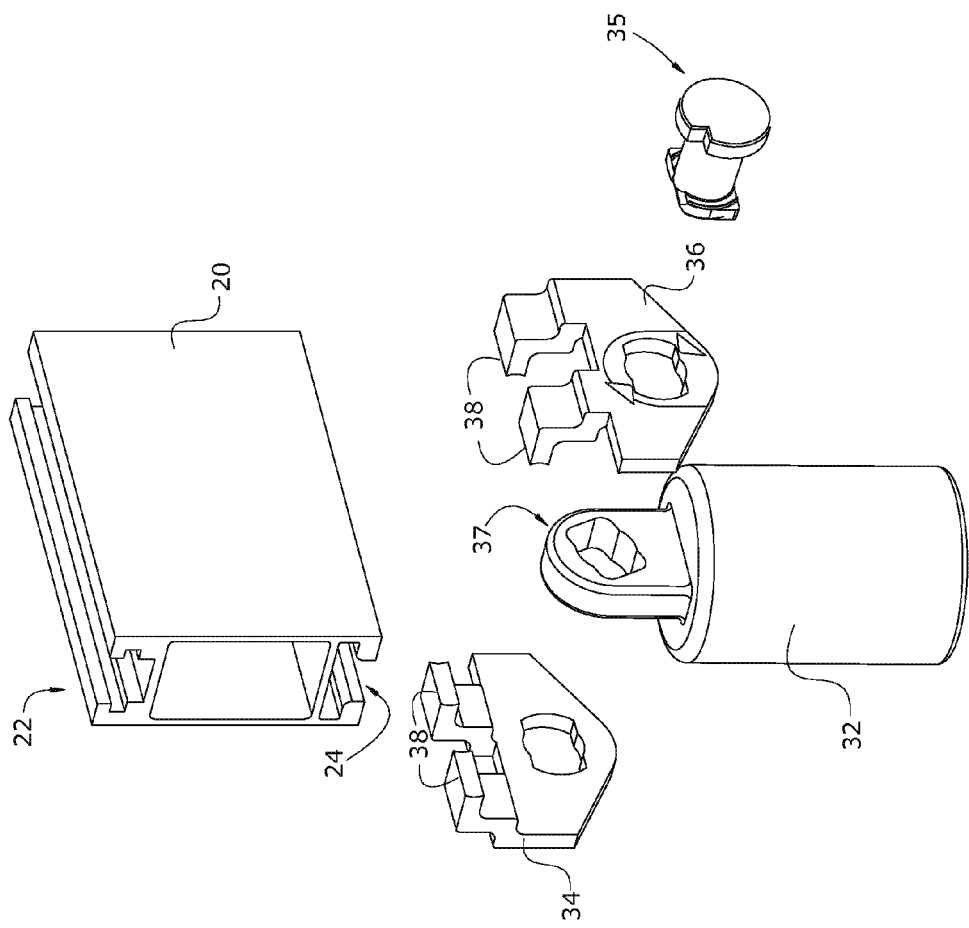

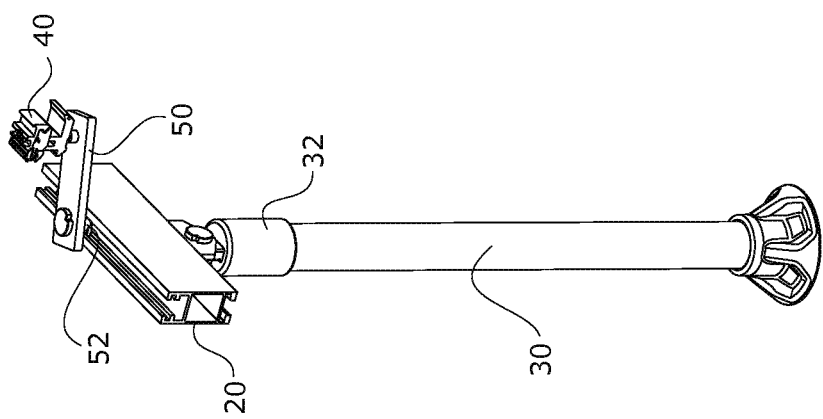

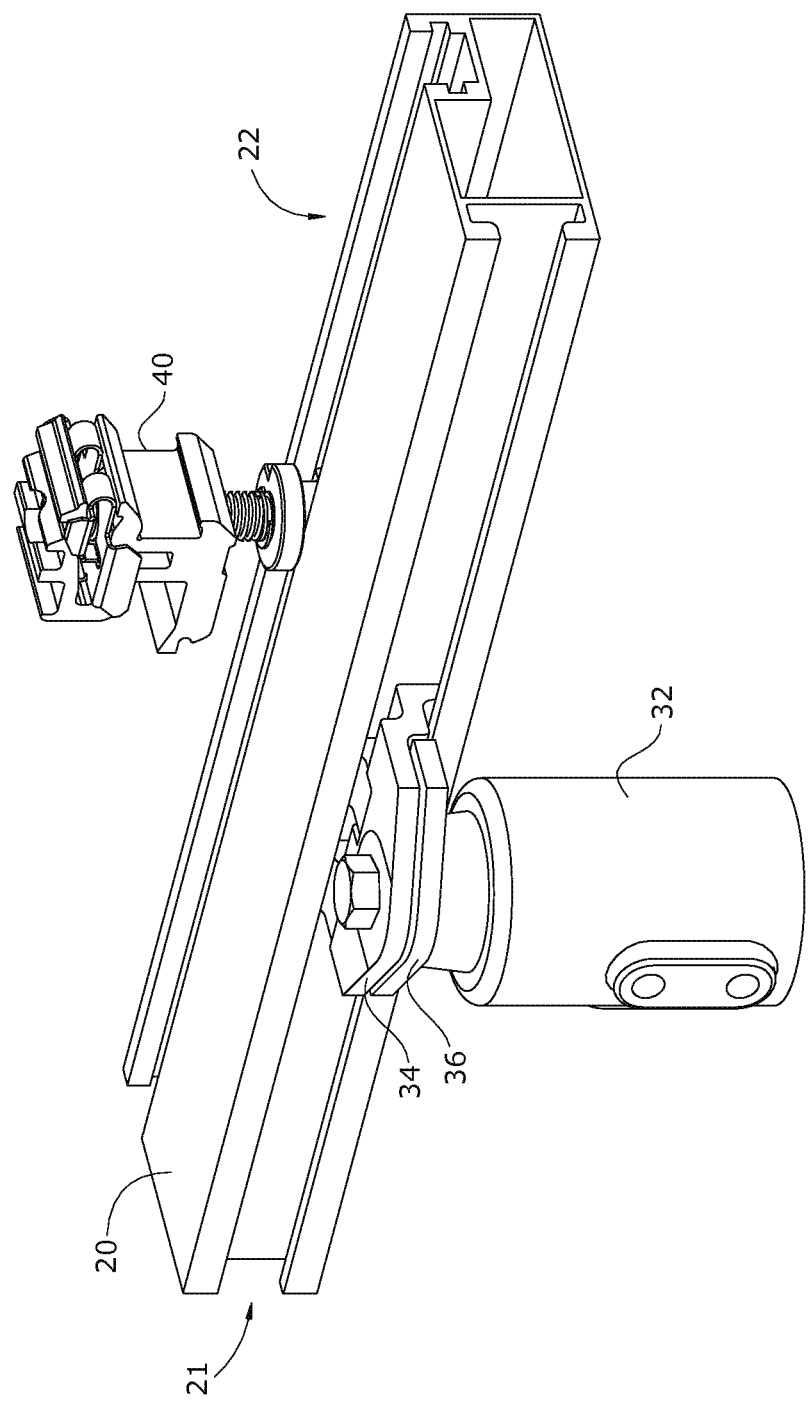

SYSTEMS FOR ATTACHING MOUNTING RAILS ONTO PHOTOVOLTAIC MOUNTING POSTS

RELATED APPLICATION

This claims priority to U.S. Provisional Patent Application No. 62/185,363, entitled "Systems For Attaching Photovoltaic Modules And Mounting Posts Onto Mounting Rails In A Flat Roof Photovoltaic Array," filed Jun. 26, 2015 which is hereby incorporated in its entirety by reference for all purposes.

TECHNICAL FIELD

The present invention relates to photovoltaic mounting systems, and in particular to systems for rapidly assembling photovoltaic arrays on flat roof buildings.

BACKGROUND

The majority of residential photovoltaic systems in North America are designed for sloping (composite shingle or tile) roofs. However, a significant number of U.S. residential rooftops are flat. In the United States, for example, while most residential roofs are sloped, a significant number of residential rooftops in southern and western states are sloped. Many countries outside of the United States have even higher proportions of flat roofs as compared to sloped roofs than in the United States.

Traditionally, such residential flat roof systems incorporate elaborate pipe frame designs that typically have a large number of parts, and therefore take considerable time to assemble. Current pipe frame designs are also not easily adjustable due to their large number of parts. Thus, the angle of the photovoltaic array with respect to the roof is difficult to change, and it would be desirable to change this feature depending upon the latitude of the installed system such that the array best points towards the sun.

Another problem with traditional flat roof designs is building leaks. Specifically, traditional flat roof installations can lead to roof leaks when attached through the flat roof to the building rafters. Minimizing connection points through the roof is desirable. It is therefore also desirable to have maximum flexibility in determining the exact roof attachment points where the array is to be mounted onto the roof's rafters.

SUMMARY

The present system provides a rapidly installable photovoltaic array mounting system that is well suited for installation on a flat roof building. It is simple to assemble, both in the small number of components it uses, and also in the ease and speed of assembling these various components. It is easily adjustable in terms of the direction the array will point and the present system also minimizes the potential for building leaks.

In some embodiments, the system provides an array of photovoltaic modules supported by parallel mounting rails that are in turn held at an angle to the flat roof surface below. The parallel mounting rails can be supported from below by mounting posts which extend vertically downward from the bottom of the mounting rails, and can be connected thereto by a connection system that can include a pair of interlocking grasps that have interdigitated fingers that are received into a bottom groove in the mounting rail.

In some embodiments, the present system provides a system for connecting a photovoltaic mounting rail to a mounting post, which can include: a mounting rail having a groove extending therealong; a pair of interlocking grasps having interdigitated fingers, wherein the interdigitated fingers are dimensioned to be inserted into the groove in a first position and to lock into the groove in a second position; a mounting post connection member; and a fastening system connecting the pair of interlocking grasps to the mounting post connection member, wherein the fastening system is configured to move the interlocking grasps from the first position to the second position thereby securing the pair of interlocking grasps to the mounting rail.

During assembly, the mounting rails can quickly be attached onto the mounting posts by lowering the rails onto the fastening system and then tightening the fastening system. In some embodiments, tightening the fastening system may involve turning only one component.

BRIEF DESCRIPTION OF THE DRAWINGS

FIG. 6 is an exploded perspective view of the components shown in FIG. 5.

FIG. 9A is a top perspective view of a Rock-it connector attached to a cantilever arm that is in turn attached into a top groove in the mounting rail.

FIG. 10 is a side elevation view of an embodiment in which the interlocking grasps attach into the side of the mounting rail.

DETAILED DESCRIPTION OF THE DRAWINGS

Figure 1:
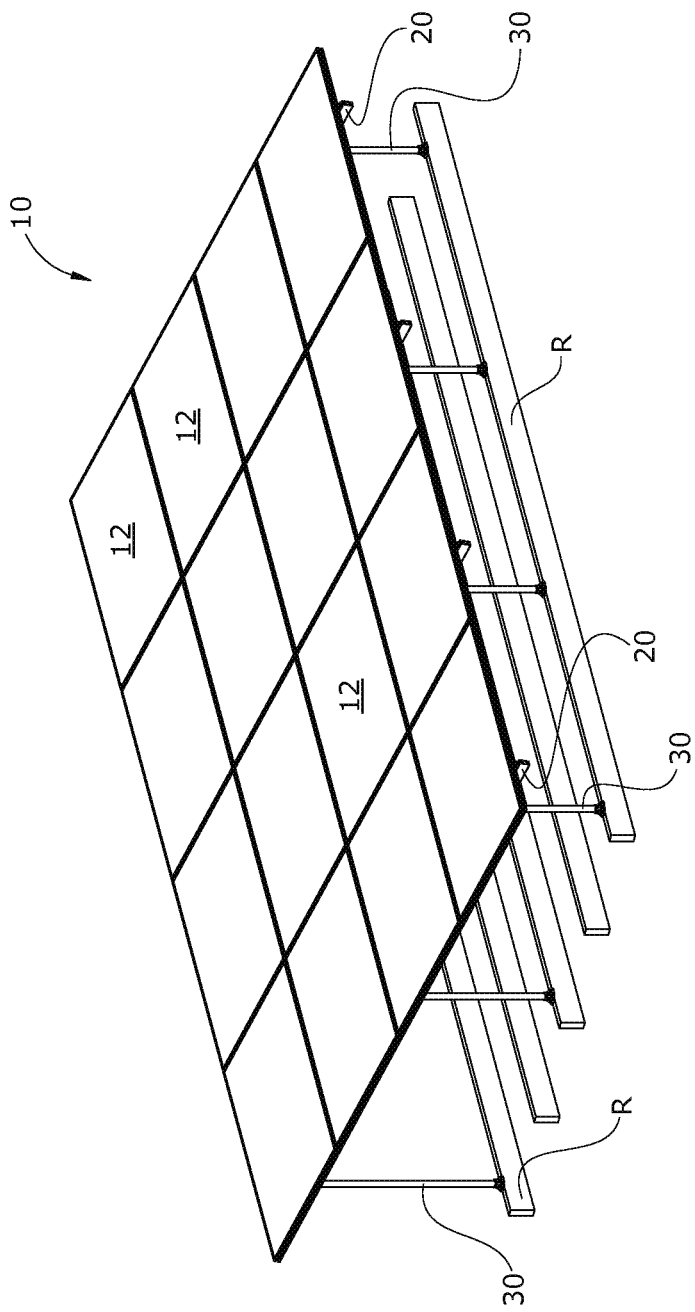
FIG. 1 is a top perspective view of a photovoltaic array incorporating the present mounting system.
Figure 2:
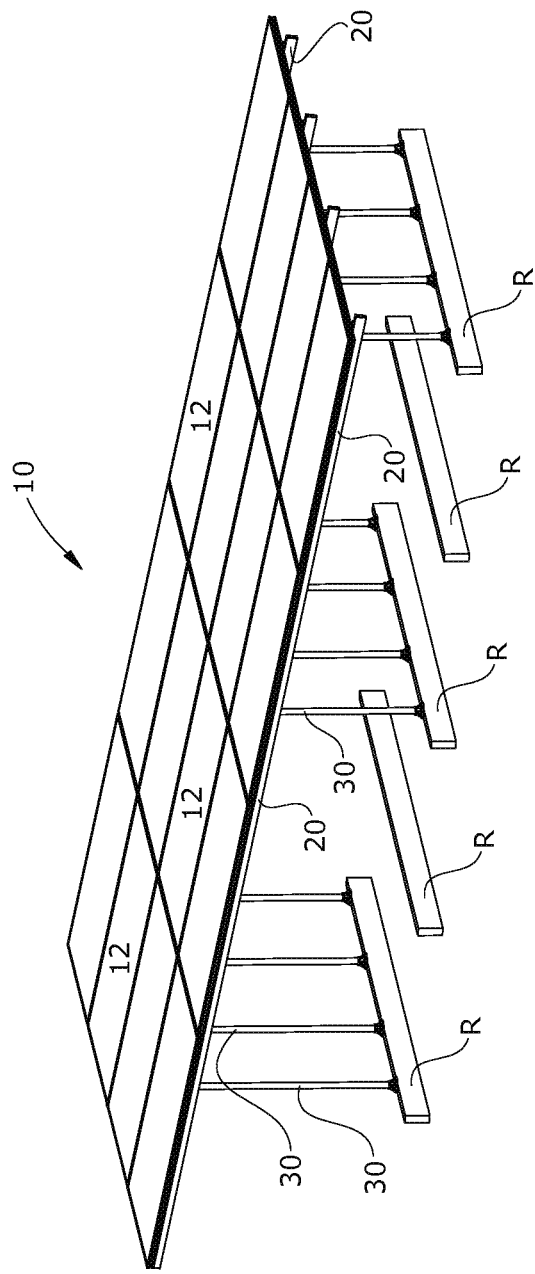
FIG. 2 is a side perspective view of a photovoltaic array incorporating the present mounting system.

FIGS. 1 to 4 are various perspective views of a photovoltaic array incorporating the present mounting system which connects mounting rails 20 (which extend under the photovoltaic array) to mounting posts 30 (which extend downwardly from the mounting rails to the roof surface), as follows. Photovoltaic array 10 comprises a plurality of individual photovoltaic modules 12 supported by parallel mounting rails 20 which are in turn supported by vertical mounting posts 30. As is shown, the bottoms of mounting posts 30 can be connected into building rafters R. As such, as best seen in FIG. 2, the three rows of mounting posts 30 can be received into three parallel building rafters positioned underneath the array. (Note: in FIGS. 1 to 4, the building roof has been removed for clarity).

Figure 4:
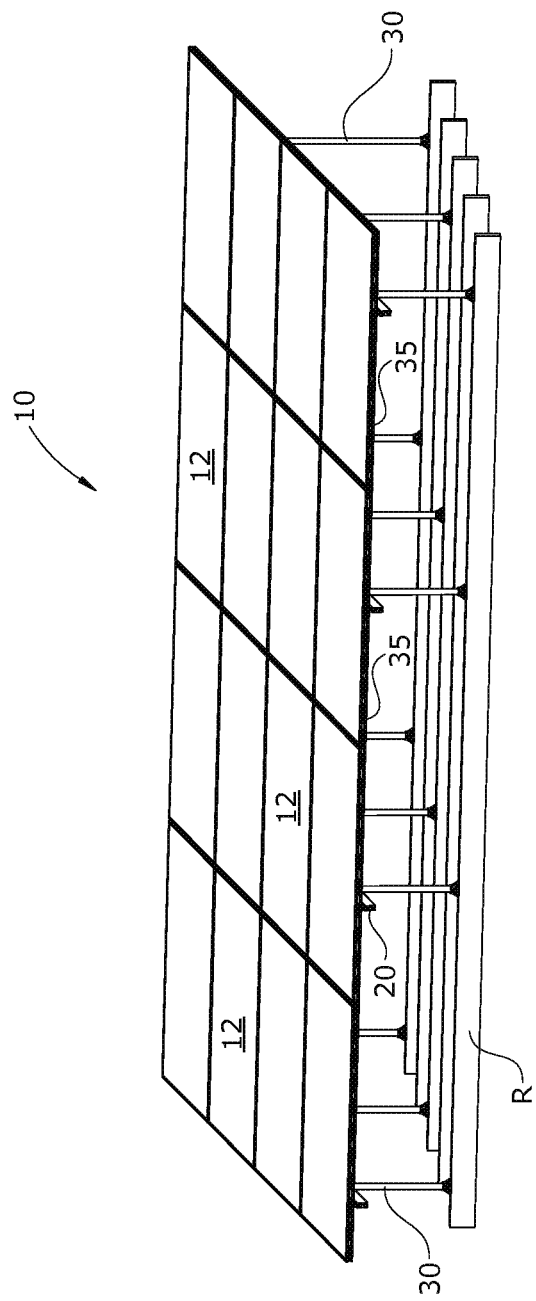
FIG. 4 is a front perspective view of a photovoltaic array incorporating the present mounting system.

Module-to-module interlocks 35 can be used to connect the modules together (FIG. 4). Interlocks 35 preferably hold the corners of four modules 12 together with no support from below, as shown. The use of module-to-module interlocks 35 connecting the four corners of modules 12 in array 10 prevents excess cantilever in modules 12, while also permitting mounting posts 30 to be positioned directly over rafters R, regardless of the positioning of the corners of each module 12 in array 10. Interlocks 35 may optionally be interlocks of the type described in FIGS. 15 to 18 of U.S. Pat. No. 8,991,114. However, the present system incorporates any suitable interlocking system for holding photovoltaic modules together. As such, interlock systems configured for grooved frame modules, non-grooved frame modules and frameless modules are all contemplated, all keeping within the scope of the present system.

Mounting posts 30 are connected at their bottom ends into building rafters R. (For ease of illustration, the building roof itself has been removed from FIGS. 1 to 4, with only the building rafters R being shown.) Typically, such a connection into the rafters can be made by lag screws, although the present invention is not so limited, as it may also be connected by adhesives, buy ballast blocks or by any other system or method.

In addition, although the present system is ideally suited for use on a flat roof residence, it may alternatively be used in other locations, and on other building structures including commercial buildings. Moreover, components of the present system can be used to mount an array onto arrays positioned on the ground, for example, the lower ends of mounting posts 30 could be positioned into the ground or onto a structure that rests on the ground.

Figure 3:
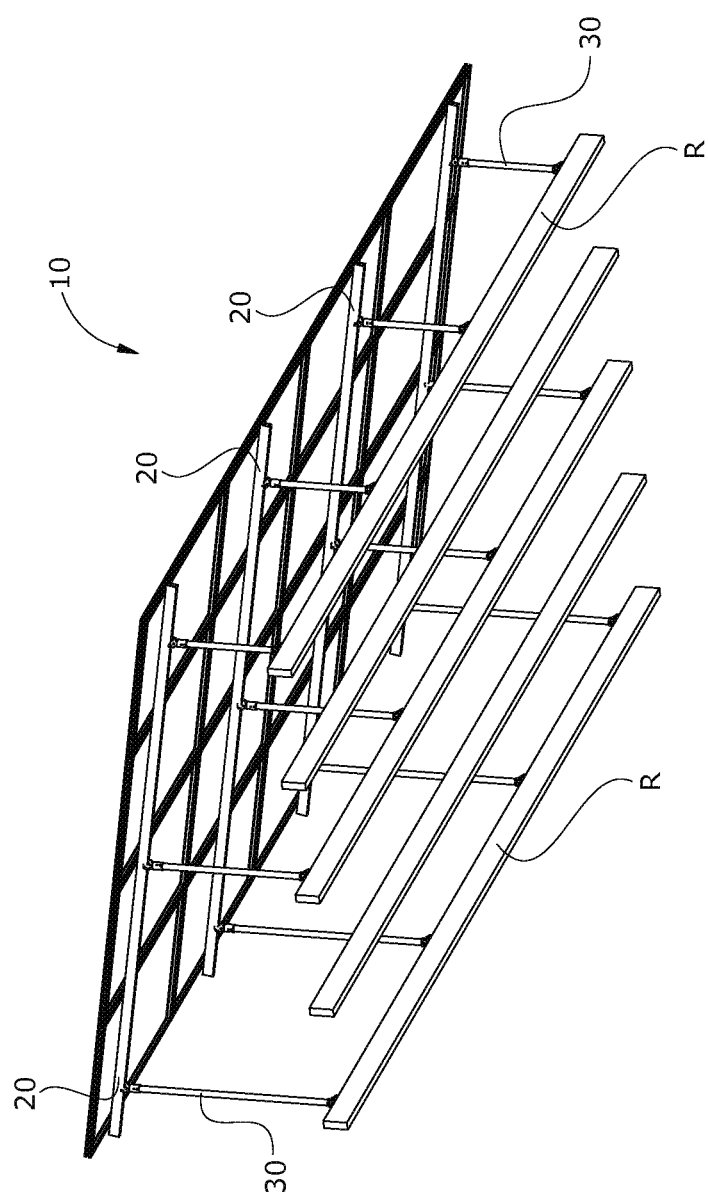
FIG. 3 is a bottom perspective view of a photovoltaic array incorporating the present mounting system.

FIG. 1 shows the present system mounted onto three parallel building rafters. FIG. 2 shows a rotated view showing mounting posts 30 connected to successive rafters R, with intervening rafter rows omitted. FIG. 3 shows a rotated underside view in which mounting rails 20 are shown extending in a direction perpendicular to rafters R. As can also be seen, mounting rails 20 can be positioned under the centers or side edges of the various modules. Thus, the positioning of mounting rails 20 underneath modules 12 need not correspond to the locations of the edges of modules 12. Rather, since mounting rails 20 are typically perpendicular to rafters R, mounting rails 20 can be positioned at various locations along the length of the sides of modules 12.

As can be seen, array 10 is positioned at an angle to the roof surface. For example, as seen in FIG. 2, longer mounting posts 30 can be used at one side of array 10 and shorter mounting posts 30 can be used at the other side of array 10. Mid-range height mounting post 30 can be used at the center of array 10.

As a result, an advantage of the present system is that the angle of array 10 to the horizon can be easily changed, without disturbing the operation of a fastening system (detailed below) that connects mounting posts 30 to mounting rails 20. In one embodiment, shorter mounting posts 30 can be used at the front of array 10, and longer mounting posts 30 can be used at the back of array 10. Mounting posts 30 of intermediate size can be used mid-way along array 10. As a result, using mounting posts 30 of different lengths results in the angle of tilt of array 10 with respect to the horizon. For example, the greater the difference in height between front and back mounting posts 30, the greater the angle of inclination of array 10 mounted thereon. By substituting posts of different heights, different array angles can be achieved. Moreover, if mounting posts 30 are themselves height-adjustable, the angle of array 10 can be adjusted at the jobsite. An embodiment of the system in which the front and back rows of mounting posts 30 are height adjustable, and the center row of mounting posts 30 is not height adjustable would still enable the angle of inclination of array 10 to be adjusted.

In one embodiment, mounting rails 20 may have top and bottom grooves extending therealong. "Rock-it" pivot connectors 40 can be mounted into the top groove and can be used to support the photovoltaic modules (which are, for example, pivot-connected thereon). A connection system is received into bottom groove 24 to attach vertical mounting posts 30 to the bottom of mounting rails 20, as follows.

Figure 5A:
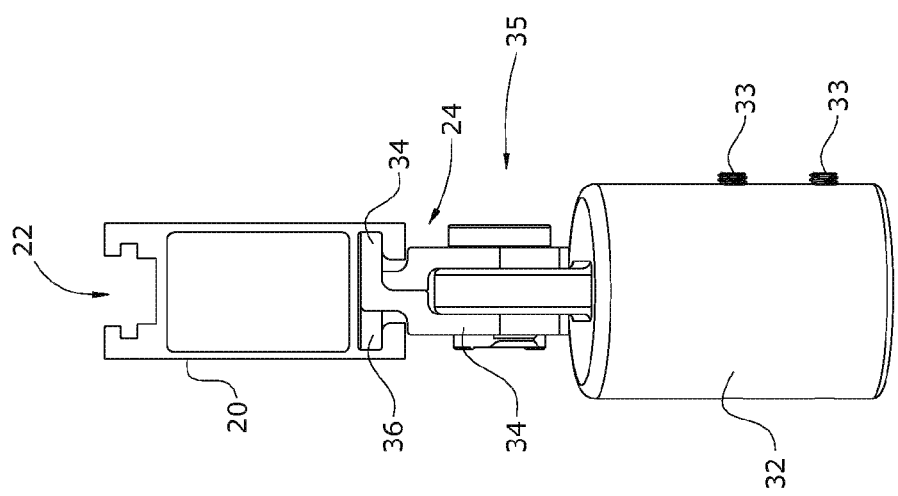
FIG. 5A is a close-up view of the present system for connecting the mounting posts onto the bottom of the mounting rails.
Figure 5B:
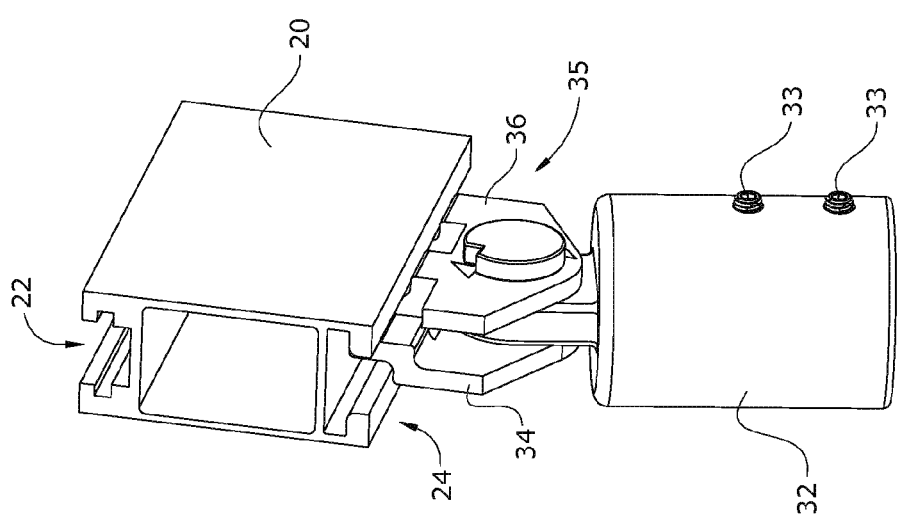
FIG. 5B is a view similar to FIG. 5A, but rotated to a different angle.
Figure 5C:
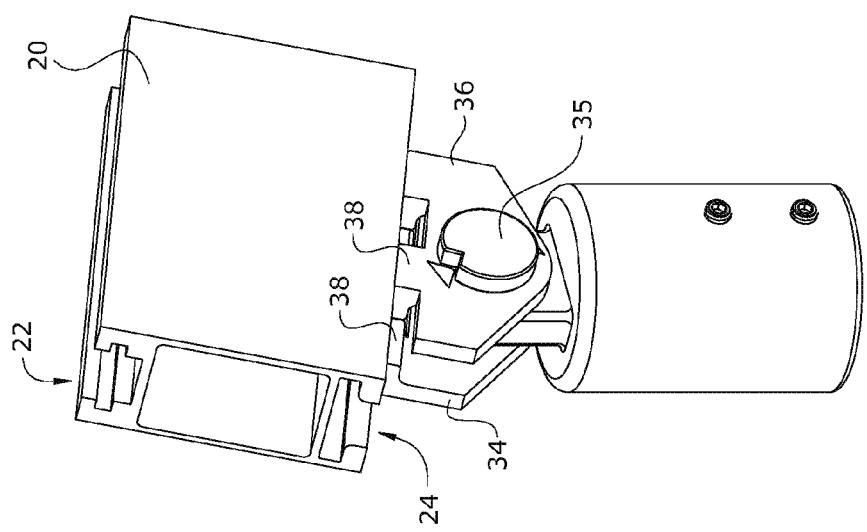
FIG. 5C is a view similar to FIGS. 5A and 5B, but rotated to another different angle.

FIGS. 5A to 5C show close-up views of the present system for connecting the tops of the mounting posts 30 onto the bottom of the mounting rails 20, as follows. In one embodiment, the top end of each mounting post 30 can be capped with mounting post connection member 32. The mounting post connection member 32 may optionally be connected onto the top of hollow mounting post 30 with set screws or push-in connector buttons 33, or with adhesives. Optionally, mounting post connection member 32 can be formed from a unitary block of material with mounting post 30. Mounting rail 20 can have top groove 22 extending therealong, and bottom groove 24 extending therealong. It is to be understood, however, that embodiments of the invention without top groove 22 or without bottom groove 24 in mounting rail 20 are also encompassed by the present system.

As seen in FIGS. 5A to 7B, in one embodiment, the present system for connecting photovoltaic mounting rail 20 onto photovoltaic mounting post 30 can use a pair of interlocking grasps 34 and 36 having interdigitated fingers 38. Specifically, as will be further explained, top and bottom grooves 22 and 24 running along the length of mounting rails 20 can have narrow openings and wide internal chambers (positioned mid-way between the front opening and the back surface of the groove). As will be shown below, when interdigitated fingers 38 are in a first position, the distance across the tops of interdigiated fingers 38 is smaller than the width of the narrow opening of bottom groove 24. Therefore, interdigitated fingers 38 can be easily inserted into bottom groove 24 in mounting rail 20 in this first position.

This attachment can be accomplished by the installer simply by placing (i.e.: lowering) mounting rail 20 down onto interlocking grasps 38 when interlocking grasps 34 and 36 are in the first position. Next, fastening system 35 can be tightened. This action will move interdigitated fingers 38 into a second position where interdigitated fingers 38 are then spread out into wide internal chamber of groove 24. As a result, interdigitated fingers 38 are positioned behind the narrow opening into bottom groove 24, thereby locking mounting rail 20 to the top of mounting post 30.

In one embodiment, the side edges of the pair of interlocking grasps 34 and 36 are spaced apart when interlocking grasps 34 and 36 are in the first position, and are in contact or are positioned closer together when interlocking grasps 34 and 36 are in the second position. Thus, fastening system 35 connects the top ends of the mounting posts into bottom groove 24 of mounting rail 20. As a result, fastening system 35 provides a convenient and easy to use system for quickly attaching the tops of the mounting posts 30 to mounting rails 20. Moreover, the present fastening system can be as simple as a nut and bolt that together move interlocking grasps 34 and 36 and their interdigitated fingers 38 from the first position to the second position. However, in other embodiments explained below, the fastening system can be a connector that needs only be rotated less than 360 degrees to move interlocking grasps 34 and 36 and their interdigitated fingers from the first position to the second position. Fastening system 35 is also configured to move the interlocking grasps 34 and 36 from the first position to the second position thereby securing the pair of interlocking grasps 34 and 36 to mounting rail 20.

An advantage of fastening system 35 is that is can preferably be used to secure interlocking grasps 34 and 36 to the top end of mounting post 30 regardless of the angle of interlocking grasps 34 and 36 (and mounting rail 20) to the horizontal. As such, fastening system 35 can be tightened with mounting rail 20 positioned at different angles.

Figure 7A:
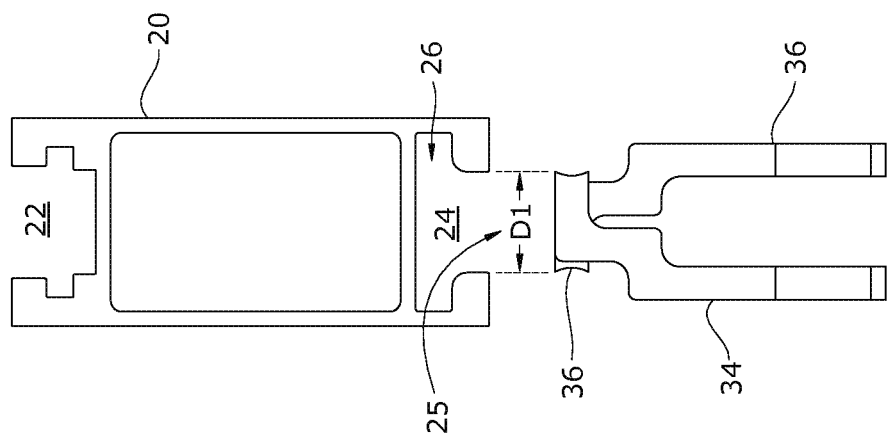
FIG. 7A is a side elevation view showing the interlocking grasps in the first position.
Figure 7B:
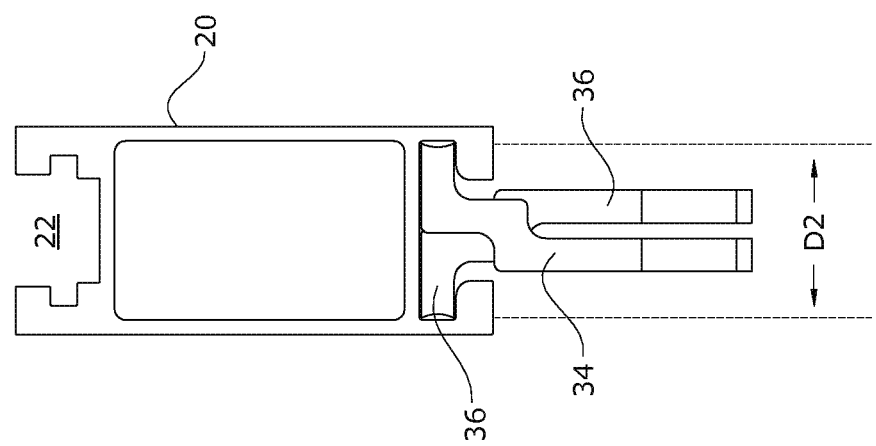
FIG. 7B is a side elevation view showing the interlocking grasps in the second position.

FIG. 6 is an exploded perspective view of the components shown in FIGS. 5A to 5C. FIG. 7A is a side elevation view showing the interlocking grasps 34 and 36 in the first position, and FIG. 7B is a side elevation view showing the interlocking grasps 34 and 36 in the second position. (Note: for clarity, the mounting rail 20 has been truncated in these views, showing only a short section thereof).

As shown in FIG. 6, fastening system 35 may be a nut that is received through apertures in each of interlocking grasps 34 and 36 and through hole 37. Rotation of fastening system nut 35 will tighten interlocking clasps 34 and 36 together. Fastening nut 35 can be dimensioned to be held and rotated using a hand tool. Upon rotation, a pair of flanges on the back end of fastening nut 35 will rotate around the back of the aperture through interlocking grasp 34, such that fastening nut 35 locks into position.

As can be seen in FIG. 7A, bottom groove 24 can have a narrow opening 25 and a wide internal chamber 26. In addition, the distance D1 across the top of interdigitated fingers of grasps 34 and 36 can be smaller than the width of narrow opening 25 of groove 24 when the pair of interlocking grasps are in the first position. Similarly, as seen in FIG. 7B, the distance D2 across the interdigitated fingers 38 of grasps 34 and 36 can be larger than the width of narrow opening 25 of groove 24 when the pair of interlocking grasps are in the second position. As can also be seen, the side edges of the pair of interlocking grasps 34 and 36 are spaced farther apart when interlocking grasps 34 and 36 are in the first position (FIG. 7A), and the side edges of the pair of interlocking grasps 34 and 36 are closer together (or in contact) when interlocking grasps 34 and 36 are in the second position (FIG. 7B). As best seen in FIG. 7B, the ends of interdigitated fingers 38 can project outwardly into sides of the wide internal chamber of the groove when the interlocking grasps are in the second position, thereby securing the mounting post connection member 32 to mounting rail 20. Moreover, the shape of bottom groove 24 and the shape of the top ends of interlocking grasps 34 and 36 can both push against the interior sides and bottom flanges of bottom groove 24. Thus, motion of mounting rail 20 with respect to interlocking grasps 34 and 36 can be prevented in the vertical and horizontal directions. Rotational movement between interlocking grasps 34 and 36 and mounting rail 20 is also inhibited by the fit of interlocking grasps 34 and 36 within groove 24.

In other aspects, fastening system 35 may simply be a nut and bolt (with the bolt passing through hole 37 in mounting post member 32). Alternatively, fastening system 35 may comprise other connectors passing through hole 37 in mounting post member 32. For example, the connector may optionally be of the type shown in FIGS. 5A to 6 and be rotated less than 360 degrees (for example, by 90 degrees) to move the interlocking grasps 34 and 36 from the first position to the second position. Advantageously, in some embodiments, only common hand tools are required to operate such a fastening system (for example, a wrench to tighten fastening device 35 by 90 degrees). Thus, the installer does not need excess space in which to rotate the end of the wrench when tightening the component.

One advantage of this design is that minimal space is required to rotate a wrench to turn connector 35. A further advantage of fastening system 35 is that mounting posts 30 can be positioned in a plurality of different non-perpendicular angles with respect to mounting rails 20. Stated another way, fastener system 35 can be tightened regardless of the angle at which mounting rail 20 is position with respect to the horizon. Moreover, the angle at which fastening system 35 supports mounting rail 20 on a mounting post 30 can be quickly adjusted prior to placing the mounting rail onto the fastening system. All that would be required would be to loosen fastening system 35 and then rotate mounting rail 20 with respect to interlocking grasps 34 and 36.

Figure 8A:
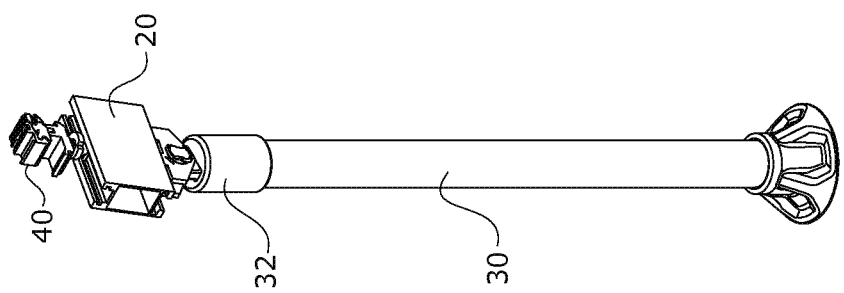
FIG. 8A is a top perspective view of a "Rock-it" connector (available under the trademark "Rock-It" by Zep Solar of San Rafael, Calif.) attached into a top groove in the mounting rail.
Figure 8B:
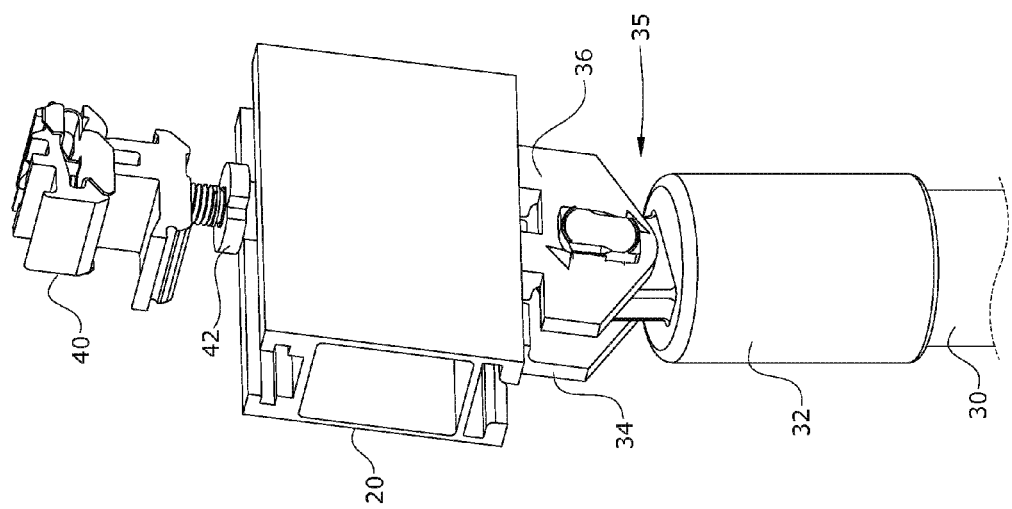
FIG. 8B is a close-up view of the components shown in FIG. 8A.

FIGS. 8A and 8B show views of a Rock-it connector mount 40 attached into top groove 22 in mounting rail 20. Rock-it connector mount 40 may be a pivot mount connector dimensioned to connect to the side edge of a photovoltaic module on opposite sides thereof. Such a Rock-it connector is described and illustrated in commonly assigned U.S. patent application Ser. No. 14/615,320, Published as 2015/0155823, entitled "Connecting Components For Photovoltaic Arrays." Rock-it connector 40 provides a fast and easy way to mount photovoltaic modules 12 onto mounting rails 20. Advantages of such an embodiment of connector 40 include the fact that it grounds one photovoltaic module to another, the fact that it is very easy to use (as an installer simply pivot drops a photovoltaic module onto either side of connector 40).

Figure 9B:
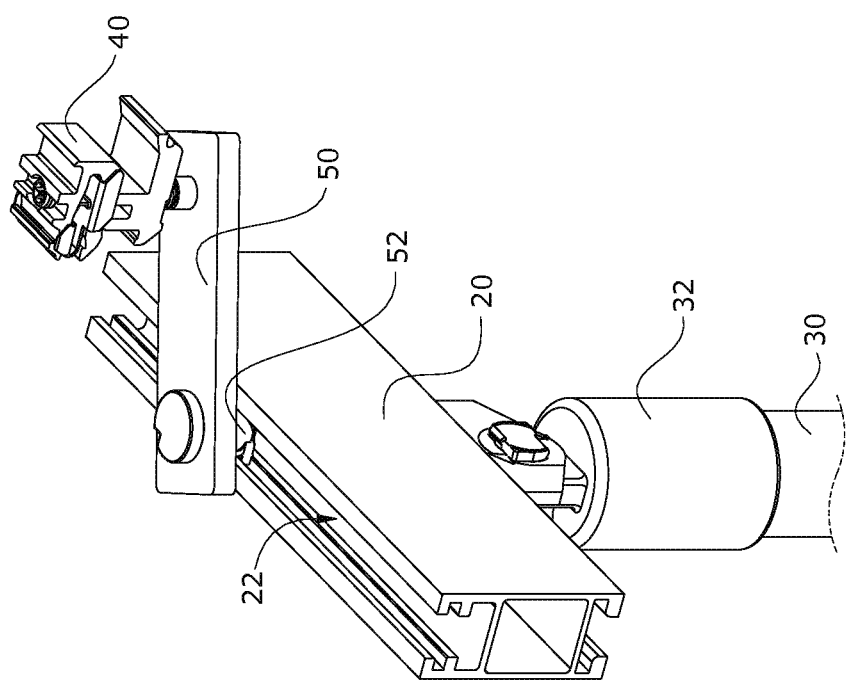
FIG. 9B is a close-up view of the components shown in FIG. 9A.

FIGS. 9A and 9B show views of a rock-it connector mount 40 attached to a cantilever arm 50 that is in turn attached into top groove 22 in mounting rail 20.

As can be seen in FIGS. 8A and 8B, the top groove 22 also can have a narrow opening and a wide internal chamber (similar to bottom groove 24). Thus, the Rock-it pivot mount connector 40 can be rotated from a first position at which the base 42 of the Rock-it pivot mount connector 40 is first inserted though the narrow opening of groove 22 to a second position at which the base 42 of the Rock-it pivot connector 40 projects outwardly into sides of the wide internal chamber, thereby locking Rock-it pivot connector 40 into top groove 22 in the second position. This provides a fast and easy way to attach connector 40 onto the top of mounting rail 20, with only one turning tool or wrench being used to twist base 42 into its locked position.

The Rock-it style connectors 40 of FIGS. 8A to 9B can be dimensioned to connect to the side edge of a pair of photovoltaic modules 12 with an edge of each of the photovoltaic modules being connected to opposite sides of the rock-it pivot mount connector 40. One advantage of rock-it connector mounts 40 is that their bottom ends can be rotated to lock into groove 22 at any desired position along mounting rail 20 (similar to how interlocking grasps 34 and 36 can be positioned at any of a plurality of continuous locations along the length of the bottom of mounting rail 20 in groove 24).

As a result, both rock-it connectors 40 (that support the photovoltaic modules) and the interlocking grasps 34 and 36 (that connect each mounting rail 20 to a mounting pole 30) can advantageously be easily moved to various desired positions along the length of the top and bottom grooves 22 and 24 of mounting rails 20, respectively. This provides flexibility both in the placement of the modules on top of the mounting rails, and in the placement of mounting posts 30 on the building's roof. As a result, connectors 40 can be moved to the desired position to best receive modules 12 thereon. Similarly, mounting post 30 can be moved to the desired position underneath mounting rail 20 such that mounting post 30 can be aligned with the building rafters below array 10.

Similarly, in FIGS. 9A and 9B, a base portion 52 of the cantilever arm can be received into the narrow opening of the groove 22, and then can be rotated to a second position at which the base 52 of the cantilever arm projects outwardly into sides of the wide internal chamber, thereby locking the cantilever arm into groove 22 in the second position.

The embodiment shown in FIGS. 8A and 8B can be used when it is desired to avoid cantilever of the modules, and the front and back edges of modules 12 can be aligned with the opposite (front and back) sides of connector mount 40. Alternatively, the embodiment shown in FIGS. 9A and 9B can be used to prevent interference between the positions of mounts 40 and module-to-module interlocks 35 (FIG. 4) in situations where it would be desirable to position both connector 40 and module-to-module interlock at the same location in the array. Specifically, the presence of cantilever arm permits connector 40 to be moved away from the location where other components (e.g.: interlocks 35 in FIG. 4) are located in array 10. Moreover, arm 50 permits connector 40 to be positioned at a variety of locations around base portion 52. Thus, connector 40 could be positioned on either side of mounting rail 20 or in front of or behind base 52.

FIG. 10 illustrates an embodiment of the present system in which mounting rail 20 has side groove 21 and top groove 22. In this embodiment, interlocking grasps 34 and 36 are received into side groove 21 and when tightened into place, lock into side groove 21 in the same manner that interlocking grasps 34 and 36 had locked into bottom groove 24 as was explained with reference to FIGS. 7A and 7B above. One advantage of this system is that the connection between interlocking grasps 34 and 36 can be tightened from directly above mounting post 30. This embodiment also permits mounting rail 20 to be rotated with respect to the vertical axis extending through mounting post 30. This feature can aid in aligning the positions of mounting rails 20 with respect to mounting posts 30 as array 10 is formed.

Figure 11:
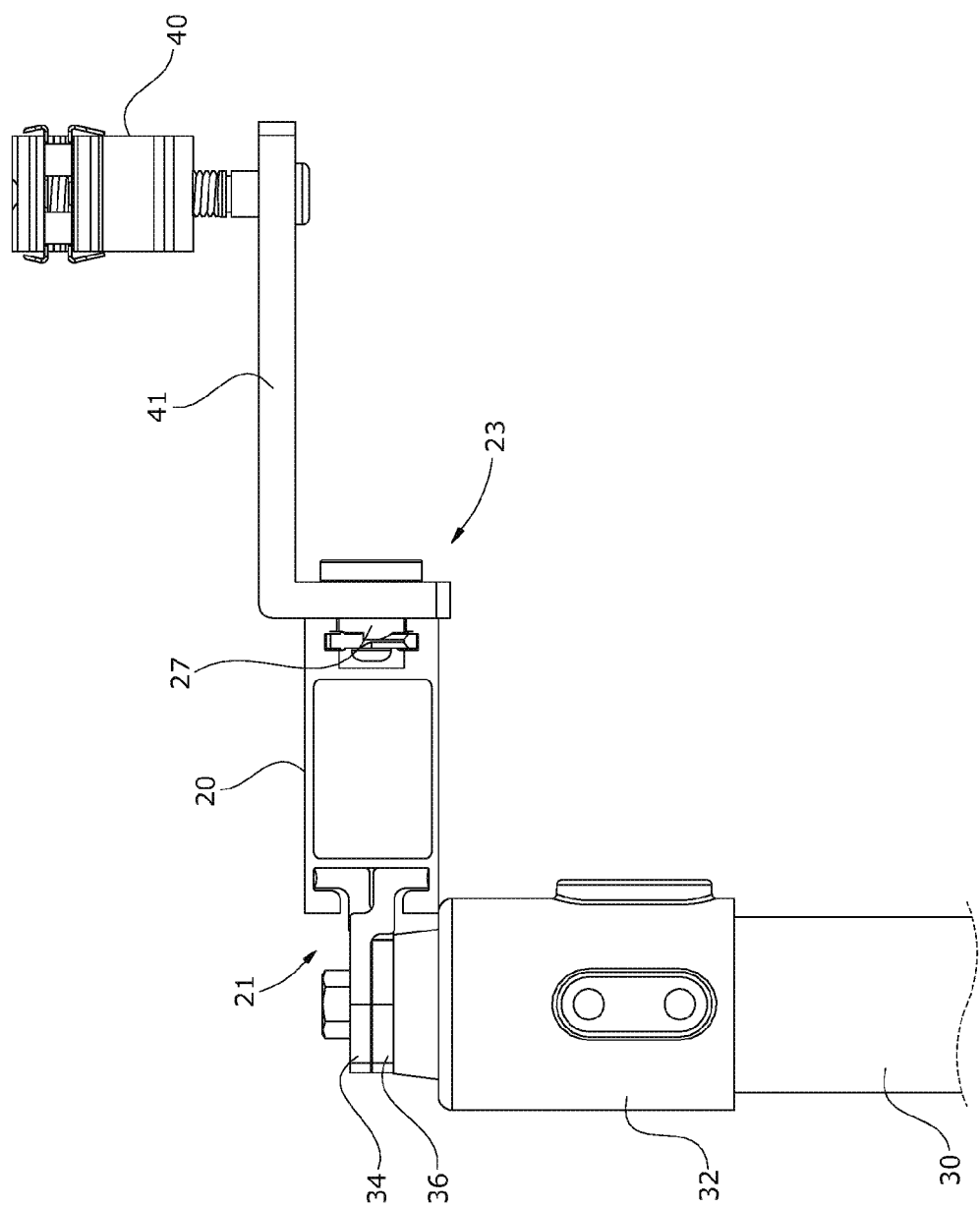
FIG. 11 is a side elevation view of another embodiment in which the interlocking grasps attach into the side of the mounting rail, and a Rock-it connector is attached to the opposite side of the mounting rail.
Figure 12:
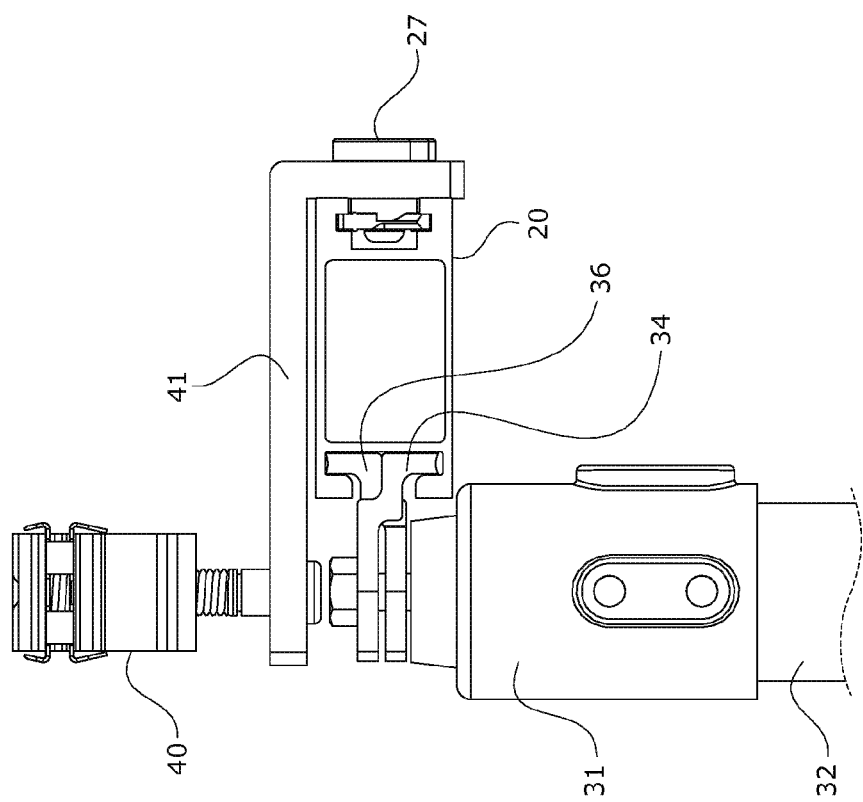
FIG. 12 is similar to FIG. 11, however the Rock-it is positioned above the mounting post.

FIGS. 11 and 12 show embodiments in which interlocking grasps 34 and 36 are similarly received into side groove 21. However, in FIG. 11, rock-it connector 40 is mounted on bracket 41 that is secured into side groove 23 by rotating connector 27 that has protrusions thereon that extend into the widened center portions of groove 23, locking the system in place. The embodiment of FIG. 11 may provide similar advantages as that seen in the embodiment of FIGS. 9A and 9B. Specifically, bracket 41 moves connector 40 away from the top of mounting post 30. This embodiment may therefore be useful in avoiding positioning conflicts between connector 40 and module-to-module interlocks 35 shown in FIG. 4.

In alternate embodiments, connector 40 shown herein may be substituted by wraparound connectors received over the top and bottom of the module frames, or by any other type of connector, all keeping within the scope of the present invention.

FIG. 12 shows a similar embodiment to FIG. 11, however, the direction of bracket 41 has been reversed such that rock-it connector 40 is instead positioned over mounting post 30 (or directly in front of or behind mounting most 30 depending upon the position of rotating connector 27 within side groove 23). An advantage of the embodiment of FIG. 12 is that bending moment is reduced or eliminated on mounting rails 20 or interlocking grasps 34 and 36.

Figure 13:
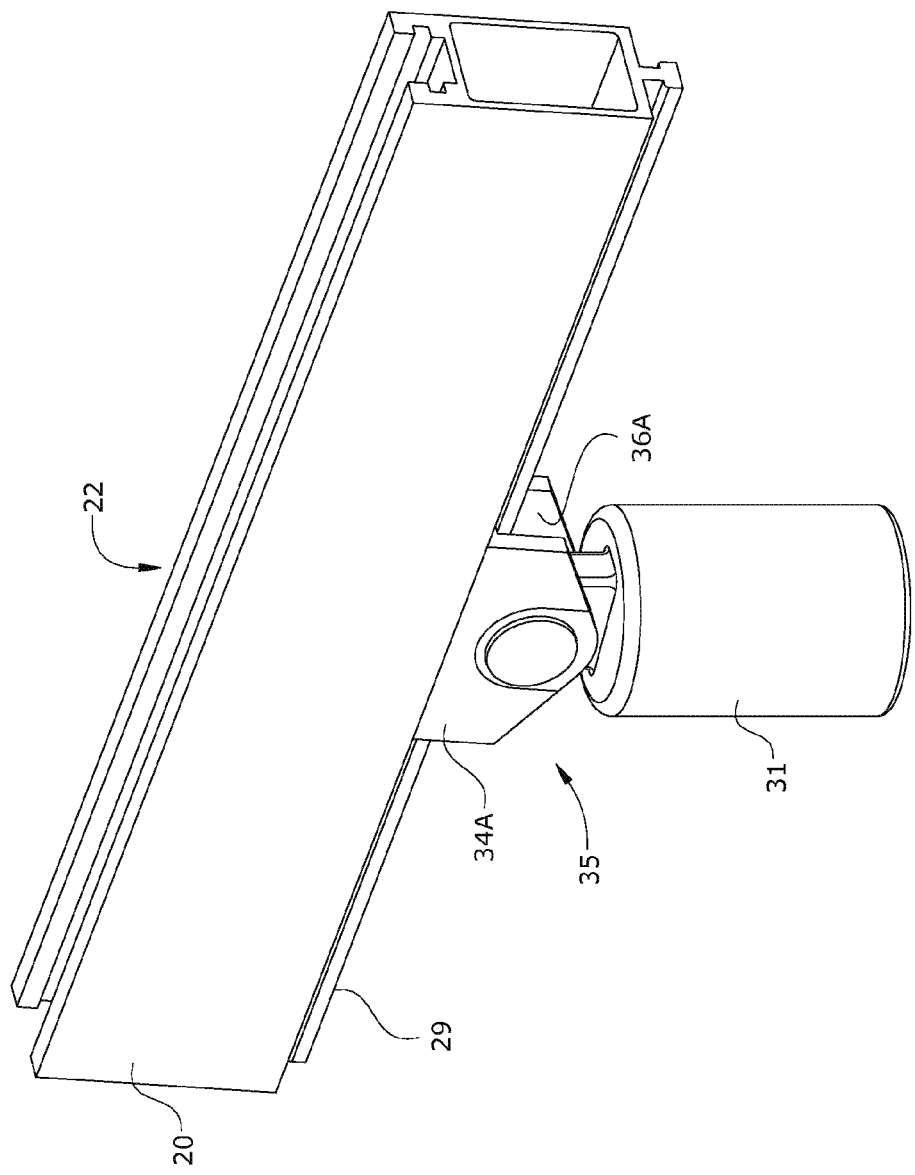
FIG. 13 is a perspective view of an alternate system using interlocking grasps to connect to a mounting rail.
Figure 14:
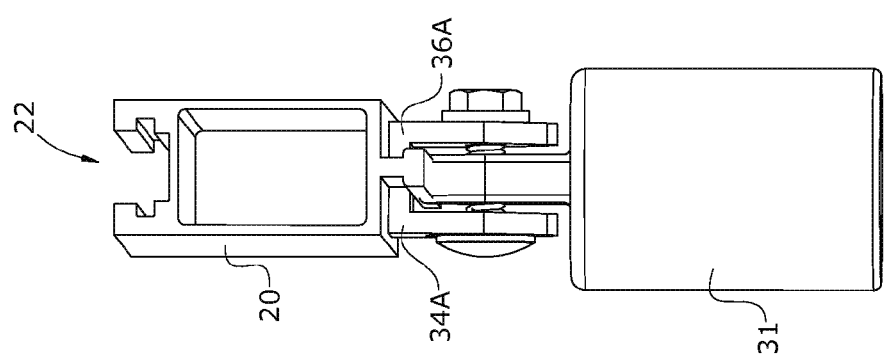
FIG. 14 is an end view of the embodiment of FIG. 13.

Lastly, FIGS. 13 and 14 show an alternate embodiment in which grasps 34A and 36A simply move towards one another to grasp onto bottom projection 29 extending along a bottom surface of mounting rail 20. In operation, the tightening of fastening system 35 moves grasps 34A and 36A towards one another, thereby securing mounting rail 20 to the top of mounting post connection member 31. One advantage of this system is that it permits mounting rail 20 to be rotated at various angles to the horizontal with grasps 34A and 34B being tightened into place at such different angles.

What is claimed is:

1. A system for connecting a photovoltaic mounting rail to a mounting post, comprising:
   a mounting rail defining a groove extending along a length of the mounting rail, wherein the groove comprises an internal chamber;
   a pair of interlocking grasps each comprising a plurality of fingers, wherein the fingers of each interlocking grasp are interdigitated, wherein the fingers are insertable into the internal chamber in a first interdigitated configuration at a plurality of continuous locations along the length of the mounting rail, and wherein the interlocking grasps are lockable into the groove at one of the plurality of continuous locations by moving from the first interdigitated configuration to a second interdigitated configuration while the interdigitated fingers are within the internal chamber;
   a mounting post connection member; and
   a fastening system connecting the grasps to the mounting post connection member, wherein the fastening system is configured to move the interlocking grasps from the first interdigitated configuration to the second interdigitated configuration with the interdigitated fingers positioned within the internal chamber.

2. The system of claim 1, wherein the groove comprises a narrow opening, and wherein a distance across the interdigitated fingers is smaller than a width of the narrow opening of the groove when the pair of interlocking grasps are in the first interdigitated configuration, and wherein the distance across the interdigitated fingers is larger than the width of the narrow opening of the groove when the pair of interlocking grasps are in the second interdigitated configuration.

3. A system for connecting a photovoltaic mounting rail to a mounting post, comprising:
   a mounting rail having a groove extending therealong;
   a pair of interlocking grasps having interdigitated fingers, wherein the fingers are insertable into the groove in a first position and lock into the groove in a second position;
   a mounting post connection member; and
   a fastening system connecting the grasps to the mounting post connection member, wherein the fastening system is configured to move the grasps from the first position to the second position,
   wherein the groove has a narrow opening and a wide internal chamber, and wherein the distance across the interdigitated fingers is smaller than the width of the narrow opening of the groove when the pair of interlocking grasps are in the first position, and wherein the distance across the interdigitated fingers is larger than the width of the narrow opening of the groove when the pair of interlocking grasps are in the second position, and
   wherein the ends of the interdigitated fingers project outwardly into sides of the wide internal chamber of the groove when the interlocking grasps are in the second position.

4. The system of claim 1, wherein the fastening system is a nut and bolt, and the bolt passes through a hole in the mounting post member.

5. The system of claim 1, wherein the fastening system is a connector passing through a hole in the mounting post member.

6. The system of claim 5, wherein the connector is rotated less than 360 degrees to move the interlocking grasps from the first interdigitated configuration to the second interdigitated configuration.

7. The system of claim 3, wherein the pair of interlocking grasps can be positioned at a plurality of locations along the length of the mounting rail.

8. The system of claim 1, further comprising:
   a mounting post extending from the mounting post connection member.

9. The system of claim 8, wherein the mounting post can be positioned a plurality of different non-perpendicular angles with respect to the mounting rails.

10. The system of claim 1, further comprising:
    a pivot mount connected to the mounting rail.

11. The system of claim 10, wherein the pivot mount is dimensioned to connect to the side edge of a pair of photovoltaic modules with a side edge of each of the photovoltaic modules being connected to opposite sides of the pivot mount.

12. The system of claim 10, wherein the mounting rail has a second groove extending therealong, and the pivot mount is received into the second groove.

13. The system of claim 12, wherein the groove extends along the a first side of the mounting rail and the second groove extends along a second side of the mounting rail.

14. The system of claim 12, wherein the second groove has a narrow opening and a wide internal chamber, and wherein the pivot mount is rotated from a first position at which a base of the pivot mount is received into the narrow opening of the second groove to a second position at which the base of the pivot mount projects outwardly into sides of the wide internal chamber of the second groove, thereby locking the pivot mount into the second groove in the second position.

15. The system of claim 12, wherein the second groove has a narrow opening and a wide internal chamber, and wherein a rock-it pivot mount is mounted onto a cantilever arm, and wherein a base of the cantilever arm is received into the narrow opening of the groove to a second position at which the base of the cantilever arm projects outwardly into sides of the wide internal chamber, thereby locking the cantilever arm into the second groove in the second position.

* * * * *